United States Patent [19]

Chadima, Jr. et al.

[11] 4,282,425

[45] Aug. 4, 1981

[54] INSTANT PORTABLE BAR CODE READER

[75] Inventors: George E. Chadima, Jr., Cedar Rapids, Iowa; Vadim Laser, Cincinnati, Ohio

[73] Assignee: Norand Corporation, Cedar Rapids, Iowa

[21] Appl. No.: 60,413

[22] Filed: Jul. 25, 1979

[51] Int. Cl.³ .............................................. G06K 7/10
[52] U.S. Cl. .................................... 235/462; 250/555
[58] Field of Search ............... 235/383, 454, 455, 462, 235/463, 472, 466; 250/555, 566, 568, 569

[56] References Cited

U.S. PATENT DOCUMENTS

| | | | |
|---|---|---|---|
| 3,536,894 | 10/1970 | Travioli | 235/468 |
| 3,812,325 | 5/1974 | Schmidt | 235/467 |
| 3,870,865 | 3/1975 | Schneiderhan et al. | 235/454 |
| 3,875,419 | 4/1975 | Harms, Jr. | 235/462 |

Primary Examiner—Daryl W. Cook
Attorney, Agent, or Firm—Hill, Van Santen, Steadman, Chiara & Simpson

[57] ABSTRACT

A portable instant bar code reader including a hand-held reader unit having a flash type illuminator. The flash type illuminator is triggered to illuminate a bar code label positioned adjacent to a light receiving window of the reader. Reflections from the bar code label are transmitted through the light receiving window and are focused onto a photodiode array by means of a lens. The photodiode array is scanned automatically, and read-out pulses are developed into logic which represents the information contained in the bar code.

12 Claims, 8 Drawing Figures

INSTANT PORTABLE BAR CODE READER

BACKGROUND OF THE INVENTION

1. Description of the Prior Art

Bar code scanners have, in the past, taken in the form of a wand or pen type scanner. The wand or pen contains a light source which is used to illuminate a bar code label. Reflected light from the label is read by a photo cell on a point-by-point basis. As the wand is manually scanned across the bar code, the black and white portions of the code are read by sensing changes in the intensity of the reflected light. These prior art scanners use significantly more power than the flash type reader of the present invention. Also, the flash type reader is an instant reader, while the wand type scanner requires slow and careful manual movement of the wand across the label.

2. Field of the Invention

The field of art to which this invention pertains is bar code scanning devices, and, in particular, to portable or hand-held units for reading bar code labels and for inputting data therefrom into a hand-held data entry and storage unit.

SUMMARY OF THE INVENTION

It is an important feature of the present invention to provide a portable instant bar code reader.

It is another feature of the present invention to provide a portable instant bar code reader having a flash type illuminator.

It is a principle object of the present invention to provide a portable instant bar code reader having a flash type illuminator using a photodiode array to store an image of the bar code and to employ electronic circuitry to read-out that image.

It is also an object of the invention to provide a portable instant bar code reader which includes circuitry for automatically clearing a photodiode array of noise, triggering a flash type illuminator, automatically reading-out the photodiode array and developing logic indicative of the bar code image focused on the photo diode array.

These and other features, objects and advantages of the present invention will be understood in greater detail from the drawings and the following description wherein reference numerals illustrate a preferred embodiment.

DESCRIPTION OF THE PREFERRED EMBODIMENT

The present invention relates to a bar code reading device which uses a flash tube as an illuminator and a photodiode array as a means for storing an image of the bar code. The image on the photodiode array is subsequently read out by means of read-out pulses applied to the array from an oscillator. The read-out pulses are used to develop logic signals which may be entered into a hand-held data entry device. The image of the bar code is focused onto the photodiode array by means of a lens which is positioned between a light receiving window and the photodiode array.

To operate the bar code reader of the present invention, the user positions the device proximate to the bar code label. If the device has a proximity sensor, the flash tube is automatically triggered to initiate automatic reading of the bar code. In the alternative, a flash button may be provided with which the operator may manually initiate flash. At the initiation of a start signal, either by manual button or by a proximity sensor, the photodiode array is automatically cleared of any spurious image and immediately thereafter, the flash tube is illuminated. Reflected light from the bar code produces an image on the photodiode array which is then scanned automatically to produce the desired output logic.

Figure 1:
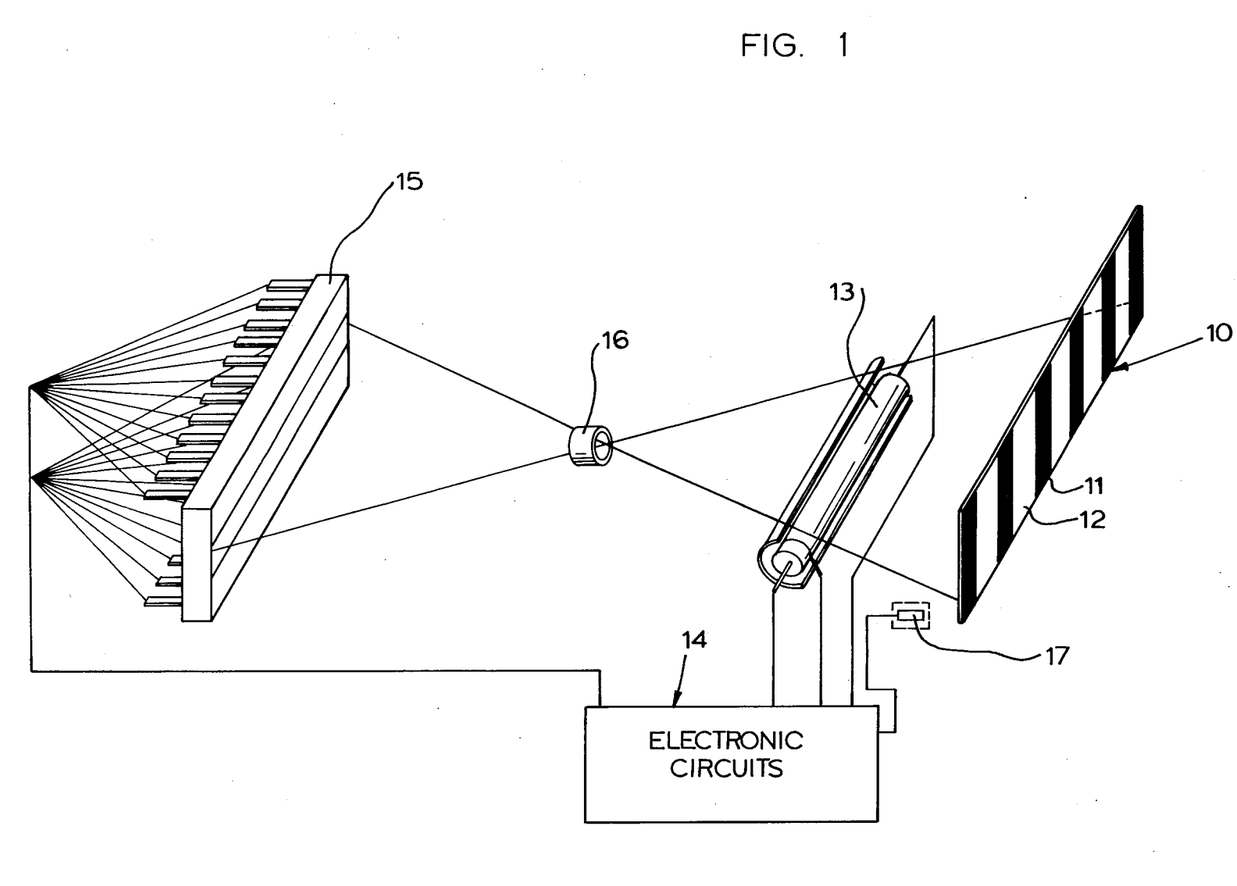
FIG. 1 is a diagrammatic perspective showing the orientation of a bar code label, a flash type illuminator, photodiode array and a lens for projecting light from the bar code label onto the array.

Referring to the drawings in greater detail, FIG. 1 shows a bar code label 10 which is to be read by the bar code reader of the present invention. The bar code consists of black and white bars 11 and 12 arranged in a well-understood manner to represent alpha-numeric characters. A flash tube 13 is positioned adjacent to the label 10, and an electronic unit 14 has the circuitry to automatically ignite the flash tube 13 at the appropriate instant. A proximity sensor 17 is shown symbolically. This sensor detects the closeness of the label to the bar code reader and produces, through the circuitry 14, a "start" signal to initiate the clearing, flash, and read-out scanning functions. A photodiode array 15 is illustrated schematically, and is positioned oppositely from a lens 16 which lens projects an image of the label 10 onto the surface of the photodiode array 15. The electronic circuitry 14 clears and reads the photodiode array at the appropriate timing sequence to be explained more fully in connection with FIGS. 5, 6 and 7.

Figure 2:
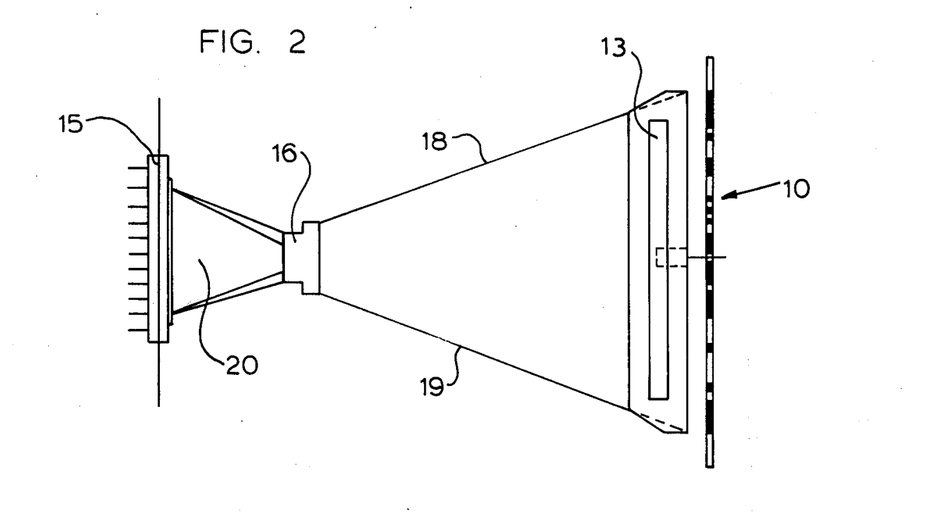
FIG. 2 is a top view of the housing and lens system for illuminating a bar code label and projecting an image thereof onto a photodiode array.
Figure 3:
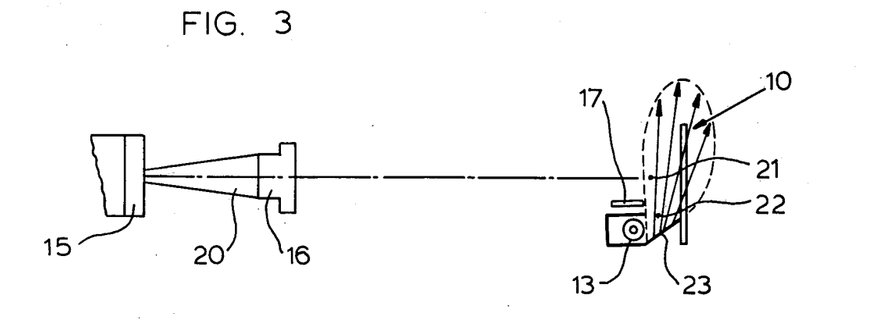
FIG. 3 is a side view of the apparatus of FIG. 2.

FIGS. 2 and 3 illustrate mechanical features associated with the portable instant bar code reader. The illumination tube 13 is positioned adjacent to the bar code 10, and after being flashed, reflected light rays such as 18 and 19 are accumulated by the lens 16 and projected onto the photodiode array 15. Light from the lens 16 is confined by means of a lens barrel 20 which essentially is a (metal or similar material) channel to conduct light from the lens and prevent spurious light from reaching the photodiode array.

FIG. 3 further illustrates the orientation of the reader to a bar code label. It can be seen that the flash tube 13 is positioned below a light receiving window 21. The region immediately ahead of the flash tube may be referred to as an illumination window 22. By means of a light guide 23, the flash tube may direct light onto the bar code label 10 in such a way as to avoid glare. Specifically, light rays strike the bar code label 10 at a large angle of incidence.

Figure 4:
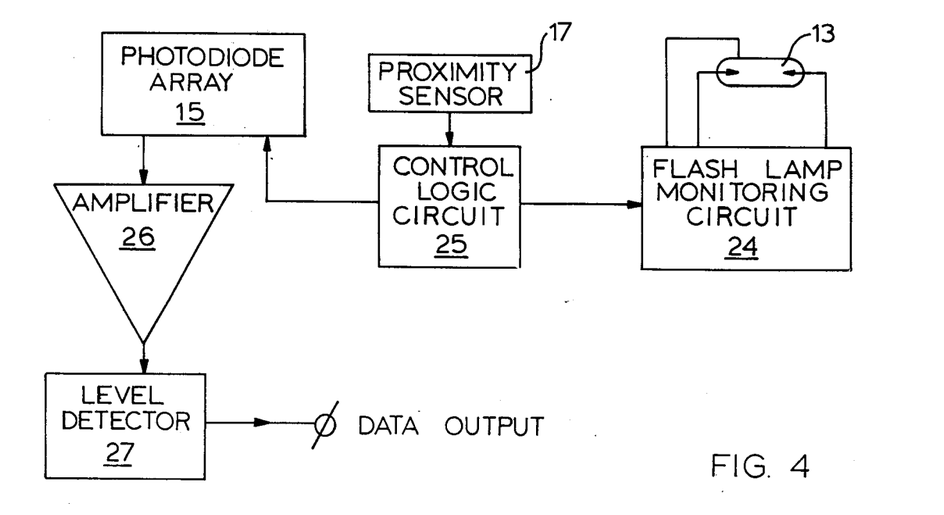
FIG. 4 is a block diagram showing the electronic functions of the reader of the present invention.

In FIG. 4, the electronic function is displayed by means of a block diagram. A flash lamp monitoring circuit 24 is used to control the charge and discharging of a circuit used to operate the flash tube 13. The circuit 24 is controlled by a circuit 25, which also controls functions associated with the photodiode array 15, such as clearing, and read out. The output of the photodiode array is coupled to an amplifier 26, and from the amplifier 26 to a level detector 27. The output of the level detector 27 is then useable as a data input to a data entry device.

Figure 5:
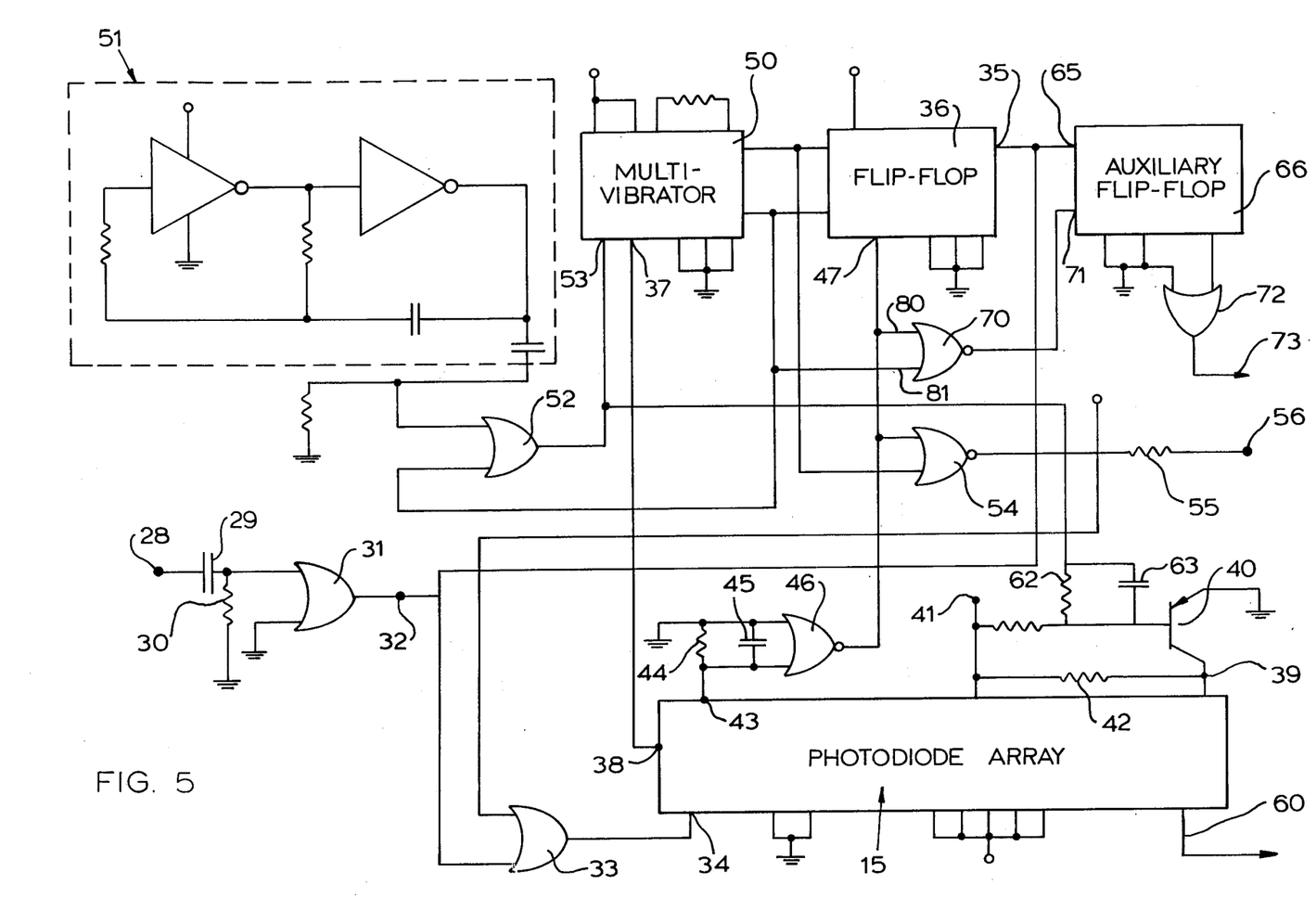
FIG. 5 is a detailed schematic showing the photodiode array and means for producing all the necessary pulses to clear, scan and read-out the photodiode array and to trigger the flash illuminator.
Figure 6:
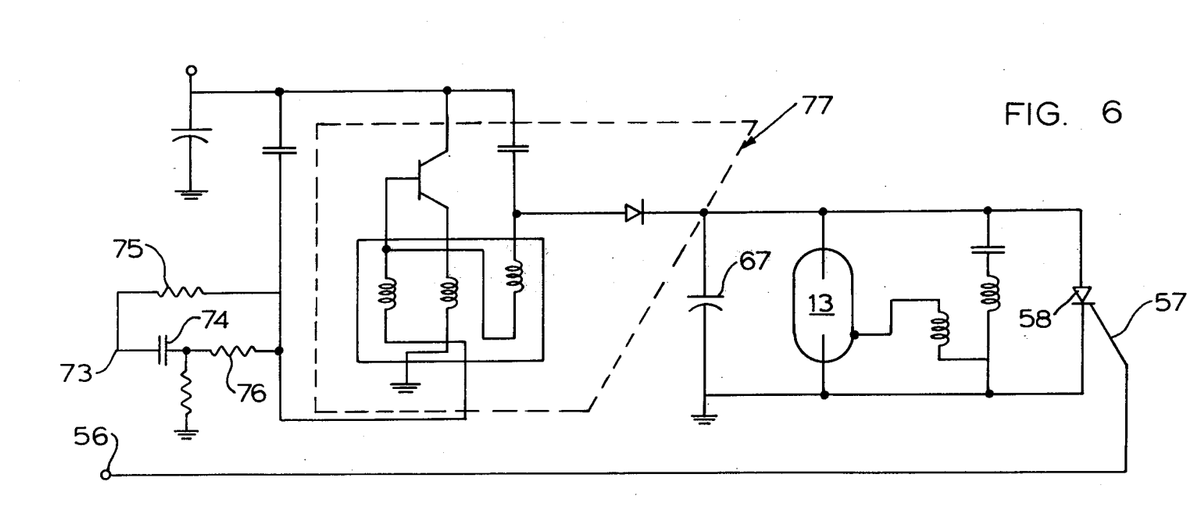
FIG. 6 is a continuation of the schematic of FIG. 5 showing the flash tube charging and discharging circuit.
Figure 7:
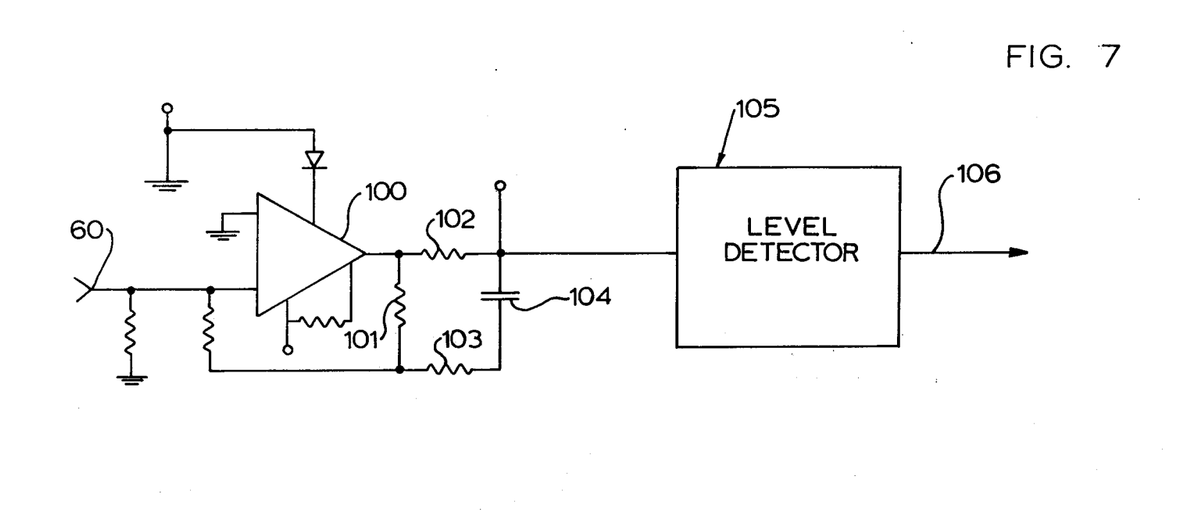
FIG. 7 is also a continuation of the circuit of FIG. 5 showing an amplifier and level detector circuit used to produce desired logic pulses which may be entered into a portable data entry unit.

Referring to FIGS. 5, 6 and 7, circuit operations are initiated by a "start" signal applied to a terminal 28 of FIG. 5. This signal may be developed either by a manual start button or by a proximity switch which develops an appropriate pulse as is well understood in the art. The "start" signal is applied to a differentiating circuit consisting of a capacitor 29 and a resistor 30. The signal is then applied to an OR gate 31 which is used as a buffer. The start signal may be actually a long duration pulse, however, the signal at the output of the OR gate 31 which also appears at a terminal point 32 will be a pulse of short duration.

The pulse developed at 32 is coupled through an OR gate 33 and applied to a terminal 34 which is the start terminal for the photodiode array 15. The photodiode array 15 may be, for example, a Redicon Device No. RL 1024G. The start signal is also coupled to a pin 35 of a flip-flop circuit 36. This start signal changes the state of the flip-flop 36 to a logic (1) which causes a multivibrator 50 to begin functioning in its astable mode with a high frequency (approximately 2 mHz) resulting in high frequency clock pulses being applied to an output terminal 37. These high frequency pulses are coupled to a clock input terminal 38 of the photodiode array 15. This causes the photodiode array to shift operation from diode to diode. Simultaneously, a negative potential is provided on a pin 39 of the device 15. This negative signal is developed due to the fact that a transistor 40 is in a non-conducting state and a negative voltage is applied from pin 41 through a resistor 42 to the pin 39. This negative signal allows the photodiode array 15 to be cleared of previous noise or previous signals as the device is shifted diode by diode by the clock pulses on the terminal 38.

Once the photodiode array 15 is cleared an "end of scan" pulse is developed at a terminal 43. This "end of scan" pulse is applied through a circuit consisting of a resistor 44, a capacitor 45, and a NOR gate 46 to a pin 47 of the flip-flop 36.

This signal on the pin 47 changes the state of the flip-flop which, in turn, causes the multivibrator 50 to operate in a monostable state whereupon it is triggered by a free-running oscillator shown enclosed in dash lines identified by the numeral 51. In this example, the oscillator operates with a period of about 100 μS. The output of the oscillator is coupled through an OR gate 52 to a pin 53 of the multivibrator 50. The output of the multivibrator appearing at the pin 37, then, is a series of clock pulses which are at a much lower frequency than was the case when it was being operated in the astable state. These controlled clock pulses cause the photodiode array 15 to begin shifting again from diode to diode.

At the same time that the flip-flop 36 is changed to logic (0), which places the multivibrator 50 in its monostable state, the "end of scan" pulse is also coupled through a NOR gate 54 and a resistor 55 to a terminal 56. The terminal 56 (FIG. 6) is then coupled to the gate pin 57 of an SCR 58 which triggers the flash tube 13. Therefore, flash occurs prior to the time the photodiode array 15 starts its second scan in the monostable state. This second scan is the "read out" scan when an image produced by the flash is read out and appears at a terminal 60 of the photodiode array 15.

During this read-out process, the oscillator 51 is producing pulses which are coupled through the OR gate 52 and a parallel combination of a resistor 62 and a capacitor 63 which causes the transistor 40 to be conductive. This essentially places the pin 39 of the photodiode array at ground potential which allows the array to be read out by the pulses appearing at the pin 38. The clock pulses appearing at the pin 38 are delayed slightly from the "discharge" pulses on pin 39. Read out is accomplished by the clock pulses producing a (0) signal on the terminal 39 immediately prior to the application of a succeeding clock pulse to the terminal 38.

After all the diodes of the array 15 have been read, and the signals have been received at the terminal 60, a second "end of scan" pulse is generated. After the first "start" pulse, a signal is coupled to a pin 65 of an auxiliary flip-flop 66. This sets the state of the flip-flop 66 to be disabling a charging circuit which includes a capacitor 67. When the second "end of scan" pulse is generated through the gate 46 and a gate 70 to a pin 71 of the flip-flop 66, the charging circuit is enabled, so that the capacitor 67 may be charged in readiness for the next flash. The output of the flip-flop 66 is coupled through a gate 72 to a circuit point 73 and through an RC circuit consisting of a capacitor 74 and resistors 75 and 76. The RC circuit is coupled through a DC-DC converter identified by the numeral 77 to the capacitor 67.

The gate 70 prevents the first "end of scan" pulse from triggering the flip-flop 66 due to the state of the terminal 80 of that gate. When the second "end of scan" occurs, the same signal appears on both terminals 80 and 81 of the gate 70 which produces a pulse at pin 3 of the flip-flop 66 to change its state and thereby enabling the charge circuit.

FIG. 7 shows the processing of the video output taken from the array pin 60 (FIG. 5). This is accomplished using well known circuit techniques. The signal is first amplified in an AC amplifier 100 and then amplified in a low pass filter comprised of resistors 101, 102, 103 and capacitor 104. From here the signal passes through a level detector 105 which may be of a well known form such as a Schmidt Trigger Circuit to a data output terminal 106 where it may be used for data entry into a data storage device.

Figure 8:
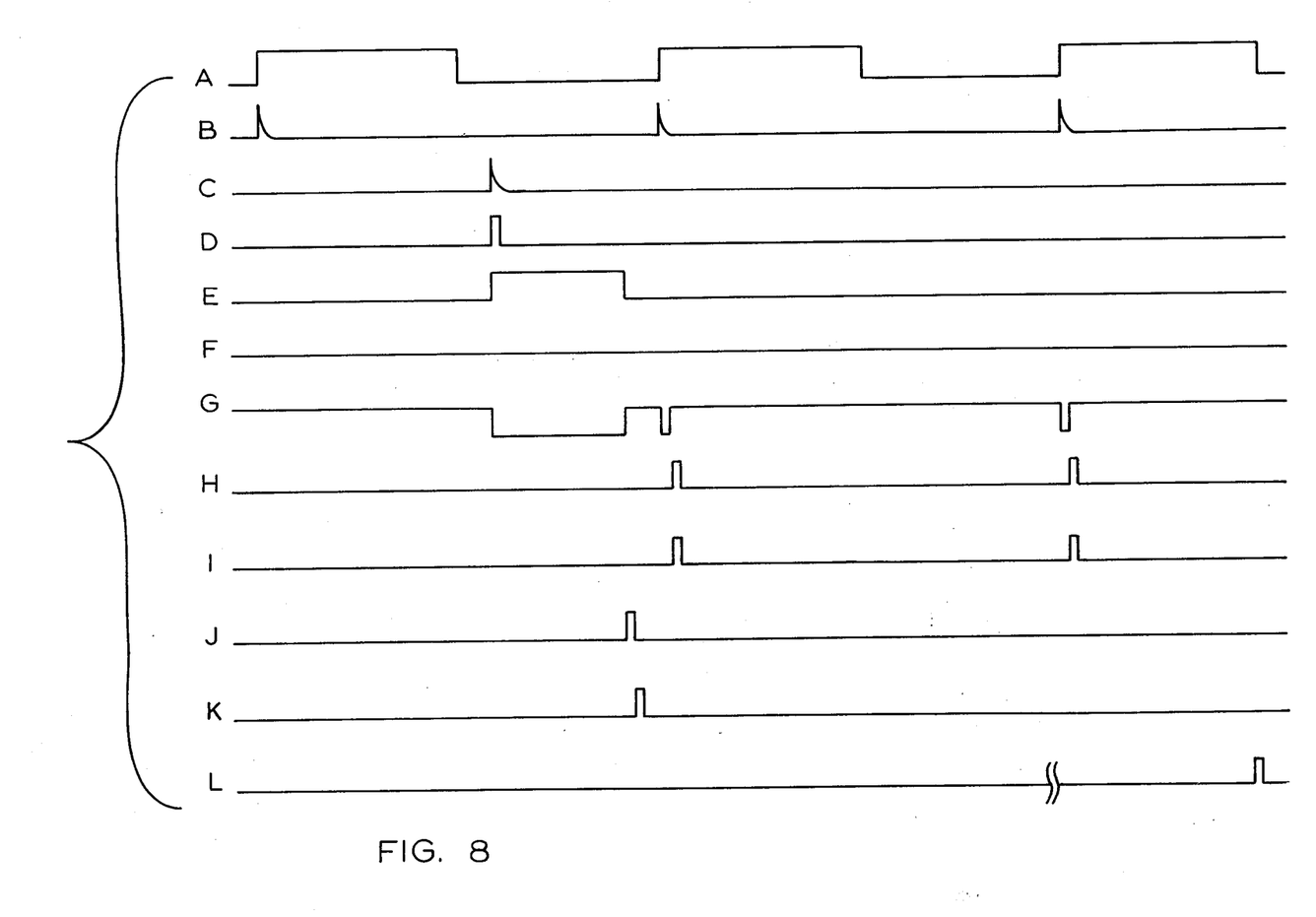
FIG. 8 is a series of pulse diagrams showing the form of pulses and the timing relationship therebetween for various points in the circuit of FIGS. 5, 6 and 7.

FIG. 8 shows a series of pulse diagrams to indicate the general shape and timing relationship of signals appearing at various points in the circuits illustrated by the circuit of FIG. 5. Specifically, diagram A shows pulse derived at the output of the osciallator 51. Diagram B shows the resulting pulses appearing at the input of the OR gate 52. These pulses result from differentiating the pulses in diagram A. Diagram C shows a pulse appearing across the resistor 30 after a start signal has been initiated either by a manual means or by a proximity sensor. Diagram D shows an actual start pulse appearing at the output of the gate 31. This may be referred to as the start-1 pulse. Diagram E shows a "clear" pulse which appears at the pin 81 of the gate 70. Diagram F is a high frequency clock pulse which appears at the terminal 38 of the photodiode array during the time when the multivibrator 50 is operating in its astable state. This may be referred to as the clock-1 signals. As explained above, during the appearance of these signals, the array is cleared in preparation for flash.

Diagram G shows the pulse form appearing at the terminal 39 of the photodiode array. Diagram H shows the clock pulses produced after flash. These are produced by the multivibrator when operating in its monostable state. They appear at the pin 38 of the photodiode array. As shown, their frequency is much lower than the frequency of the clearing pulses of Diagram F. The pulses of diagram H may be referred to as the clock-2 pulses. Diagram I shows a combination of the clock-1 and -2 pulses superimposed.

Diagram J shows a pulse which appears at the end of the scan during which time the pulses of Diagram F are functioning to clear the array. This pulse, produced by the end of scan pulse of the array is caused to appear on the terminal 56 which is coupled to the gate 57 of the SCR 58. This triggers the SCR and produces the flash.

Immediately following the flash, a pulse shown in diagram K is produced which appears at the upper input of gate 33 and thereby produces a pulse on the pin 34 of the array. This may be referred to as the start-2 pulse which initiates the readout of the data produced on the array by the flash. Finally, after readout of the last diode of the array, an end-of-scan -2 pulse is produced as shown in diagram L. This completes the cycle.

It will be apparent that various modifications can be performed within the scope of the invention described in the claims hereof, however, we desire to claim all such modifications as properly come within the scope of that invention.

What we claim:

1. A portable instant bar code reader comprising:
   a hand-held bar bode reader unit, said hand-held bar code reader unit having a portion thereof defining at least in part an illumination window, a flashable illuminator disposed near said illumination window and means for producing a flash of light therethrough;
   said hand-held bar code reader unit having a portion thereof defining at least, in part, a light receiving window for receiving reflections of light emitted through said illumination window;
   a photodiode array positioned within said hand-held bar code reader in the path of light rays reflected into and through said light receiving window;
   a light gathering means positioned between said light receiving window and said photodiode array for receiving a light pattern from said light receiving window and focusing the same onto said photodiode array;
   electronic means for reading out the photodiode array; and
   means for producing logic signals which are indicative of the light pattern focused onto said photodiode array.

2. A portable instant bar code reader in accordance with claim 1 wherein said light receiving window is larger in at least one dimension than a label or part of a label with a bar code to be read by said reader and wherein at least a part of said window may be positioned proximate to a bar code label being read thereby.

3. A portable instant bar code reader in accordance with claim 2, wherein means are provided to cause siad flashable illuminator to flash when said light receiving window is positioned proximate to a bar code label to be read by said reader.

4. A portable instant bar code reader in accordance with claim 1, wherein said light receiving window comprises an elongated slot having a length greater than the length of a bar code to be read thereby wherein said illumination window having a slot like configuration with a length greater than the length of said bar code, said light receiving and illumination windows being located adjacent to each other or represented by the same single window and both being positionable adjacent to a bar code label being read by said reader.

5. A portable instant bar code reader in accordance with claim 4, wherein said light gathering means comprises a lens positioned to receive light reflected from a bar code through said light receiving window and to focus the same onto said photodiode array.

6. A portable instant bar code reader in accordance with claim 1, wherein means are provided to automatically clear said photodiode array immediately prior to initiation of a flash from said flashable illumination.

7. A portable instant bar code reader comprising:
   a hand-held unit having an illumination window and a light receiving window positioned adjacent one end thereof (or being parts of the same window);
   a flash illuminating device positioned behind said illumination window;
   said flash illuminating device and illumination window being configured to distribute light across the surface of a bar code being read by said reader, said light receiving window being adjacent to said illumination window and being configured to receive light reflected from the surface of said bar code;
   a self-scanning photodiode array disposed within the reader;
   means for casting an image of light received through said light receiving window onto said photodiode array;
   means to initiate a flash of the flash illuminating device at a desired read position and means for automatically reading out the photodiode array subsequent to a flash.

8. An electroptical pattern or character recognition reader comprising:
   a flashable illuminator;
   means for triggering the flashable illuminator;
   means for positioning the flashable illuminator in such relation to a pattern or character label so as to illuminate the same and develope a reflected light signal therefrom upon the triggering of said flashable illuminator;
   an optoelectronic spatial sensor;
   means for producing an image of said pattern or character from said reflected light signal and focusing the same onto said optoelectronic spatial sensor;
   means for reading out said optoelectronic spatial sensor, and
   means for processing the output of said readout means to produce logic signals indicative of said image as focused on said optoelectronic spatial sensor.

9. An electroptical pattern or character recognition reader comprising:
   an optical head;
   an optoelectronic spatial sensor positioned within said optical head;

a flashable illuminator and means for triggering the same;

said optical head having an optical reflector and concentrator and an illumination window;

said flashable illuminator being disposed within said optical reflector and concentrator at a position to cause a high intensity of light to pass through said illumination window upon the triggering of said flashable illuminator;

said illumination window being positionable near a label bearing a pattern or character to be read, a light receiving opening formed within said optical head for receiving reflected light from said label;

light gathering means positioned between said light receiving window and said optoelectronic spatial sensor;

means directing light from the light gathering means into said optoelectronic spatial sensor;

means for reading out said optoelectric spatial sensor; and means for processing the output of said readout means to produce logic signals indicative of said image as focused on said optoelectronic spatial sensor.

10. An electroptical pattern or character recognition reader in accordance with claim 9 wherein said optical reflector is contoured as a portion of an eliptical cylinder, including said flashable illuminator being disposed at the focal axis of said eliptical cylinder, and said eliptical cylinder having end reflectors.

11. An electroptical pattern or character recognition reader in accordance with claim 10 wherein said flashable illuminator is disposed toward one side of said light receiving window.

12. An electroptical pattern or character recognition reader in accordance with claim 11 wherein a shield is provided to block a portion of light from the flashable illuminator from entering the light receiving window prior its being reflected from the pattern or character label to be read.

* * * * *

Disclaimer

4,282,425—*George E. Chadima, Jr.,* Cedar Rapids, Iowa; *Vadim Laser,* Cincinnati, Ohio. INSTANT PORTABLE BAR CODE READER. Patent dated Aug. 4, 1981. Disclaimer filed Apr. 18, 1991, by the assignee, Norand Corp.

The term of this patent subsequent to Aug. 4, 2008, has been disclaimed.
[ *Official Gazette July 30, 1991* ]